(12) United States Patent
Herrema

(10) Patent No.: US 9,964,137 B2
(45) Date of Patent: May 8, 2018

(54) THROUGH-HULL FITTING

(71) Applicant: Flow-Rite Controls, Ltd., Byron Center, MI (US)

(72) Inventor: Mark W. Herrema, Rockford, MI (US)

(73) Assignee: FLOW-RITE CONTROLS, LTD., Byron Center, MI (US)

( * ) Notice: Subject to any disclaimer, the term of this patent is extended or adjusted under 35 U.S.C. 154(b) by 205 days.

(21) Appl. No.: 14/988,036

(22) Filed: Jan. 5, 2016

(65) Prior Publication Data

US 2016/0123372 A1    May 5, 2016

Related U.S. Application Data

(63) Continuation of application No. 13/936,530, filed on Jul. 8, 2013, now Pat. No. 9,261,129.

(51) Int. Cl.
| | |
|---|---|
| *F16B 19/00* | (2006.01) |
| *F16B 39/12* | (2006.01) |
| *F16B 21/07* | (2006.01) |
| *F16L 41/12* | (2006.01) |
| *F16L 5/02* | (2006.01) |
| *F16B 13/04* | (2006.01) |

(52) U.S. Cl.
CPC .............. *F16B 39/12* (2013.01); *F16B 13/04* (2013.01); *F16B 21/073* (2013.01); *F16L 5/027* (2013.01); *F16L 41/12* (2013.01)

(58) Field of Classification Search
CPC .... F16B 39/12; F16B 37/0842; F16B 37/085; F16L 41/08; F16L 41/14
USPC ...................................... 411/510; 114/183 R
See application file for complete search history.

(56) References Cited

U.S. PATENT DOCUMENTS

| | | | |
|---|---|---|---|
| 1,890,348 A | | 12/1932 | Weatherhead, Jr. |
| 2,137,223 A | * | 11/1938 | Baxter .................... F16L 41/14 285/139.1 |
| 3,368,247 A | | 2/1968 | Orban |
| 3,700,381 A | * | 10/1972 | Deeke ....................... E03C 1/20 4/288 |
| 4,263,697 A | | 4/1981 | Speedie |

(Continued)

FOREIGN PATENT DOCUMENTS

WO    2010053777 A2    5/2010

OTHER PUBLICATIONS

American Boat and Yacht Council (ABYC) summary of ABYC Standards, 48 pages, summary of Standard H-27 at pp. 24 and 25) (Acknowledged prior art).

(Continued)

*Primary Examiner* — Gary W Estremsky
(74) *Attorney, Agent, or Firm* — Warner Norcross and Judd LLP

(57) ABSTRACT

The specification discloses a fastener assembly including two elements. One element is an elongated body including that a gear rack and a radial stop. The other element is a nut fitted over the elongated body and including a pawl engaging the gear rack. The current embodiment includes two pairs of gear racks and two pairs of pawls. The two pairs of pawls are axially offset from one another. The elongated body and the nut are keyed to prevent relative rotation therebetween. The elongated body defines a conduit through the fastener assembly.

6 Claims, 7 Drawing Sheets

(56) References Cited

U.S. PATENT DOCUMENTS

| | | | | |
|---|---|---|---|---|
| 4,915,422 A | * | 4/1990 | Chacon | B25B 27/10 277/615 |
| 5,154,376 A | | 10/1992 | Baum et al. | |
| 5,273,466 A | * | 12/1993 | Thompson | B60K 15/035 137/587 |
| 5,341,760 A | * | 8/1994 | Summers | B63B 13/00 114/222 |
| 5,439,256 A | * | 8/1995 | Brainard | E02B 7/005 114/361 |
| 5,619,770 A | * | 4/1997 | Bell | A47L 11/164 15/230 |
| 5,619,779 A | | 4/1997 | Geyer | |
| 5,741,030 A | | 4/1998 | Moore et al. | |
| 5,803,413 A | | 9/1998 | Benoit et al. | |
| 6,038,992 A | * | 3/2000 | Smith | B63B 13/00 114/183 R |
| 6,050,867 A | * | 4/2000 | Shields | B63B 13/02 114/183 R |
| 7,210,423 B2 | * | 5/2007 | Haugen | B63B 13/00 114/183 R |
| 7,286,350 B2 | * | 10/2007 | Lee | F04D 29/545 257/712 |
| 7,918,486 B2 | * | 4/2011 | Preisendorfer | F16L 41/088 285/136.1 |
| 2002/0189674 A1 | | 12/2002 | Meeder | |
| 2007/0163480 A1 | | 7/2007 | Cotton | |
| 2008/0093843 A1 | | 4/2008 | Noroozi et al. | |
| 2009/0050043 A1 | * | 2/2009 | Alvarez | B63B 13/00 114/197 |
| 2009/0249923 A1 | | 10/2009 | Seidel | |

OTHER PUBLICATIONS

American Boat and Yacht Council (ABYC) Standard H-27 definition of "Through-Hull Fitting" and "Maximum Heeled Naterline" (1 page) (Acknowledged prior art).

International Search Report and Written Opinion from PCT/US2014/039270 dated Sep. 11, 2014.

\* cited by examiner

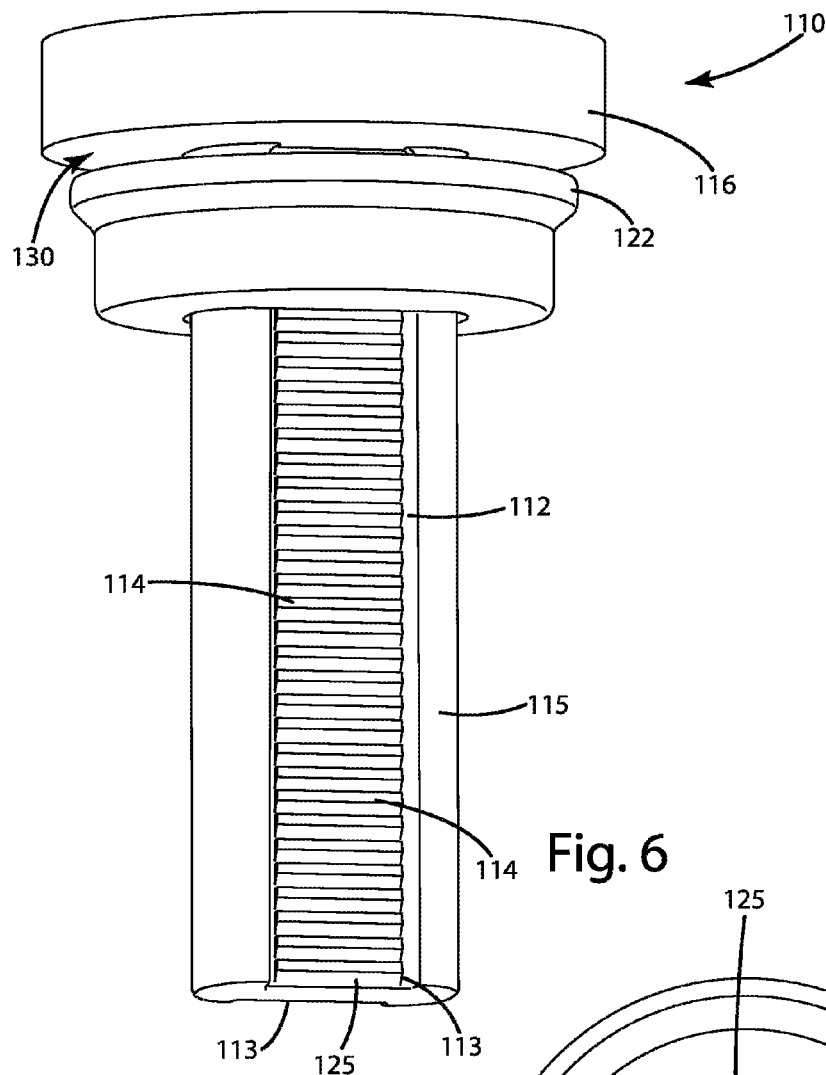
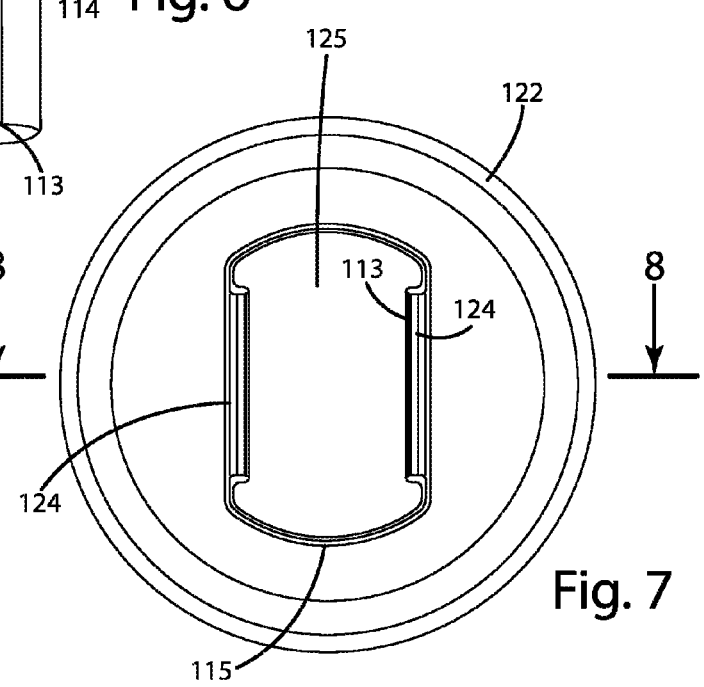
Fig. 6
Fig. 7

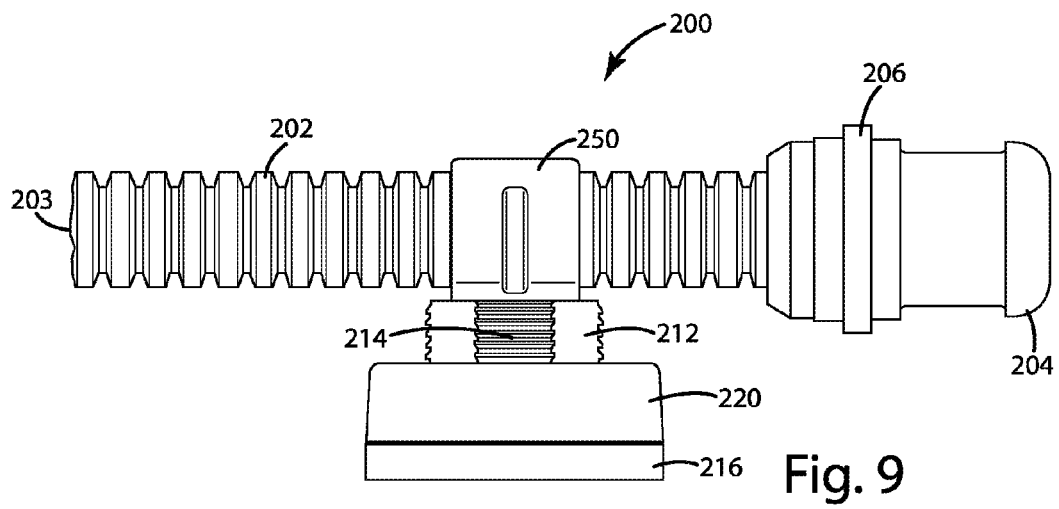
Fig. 9
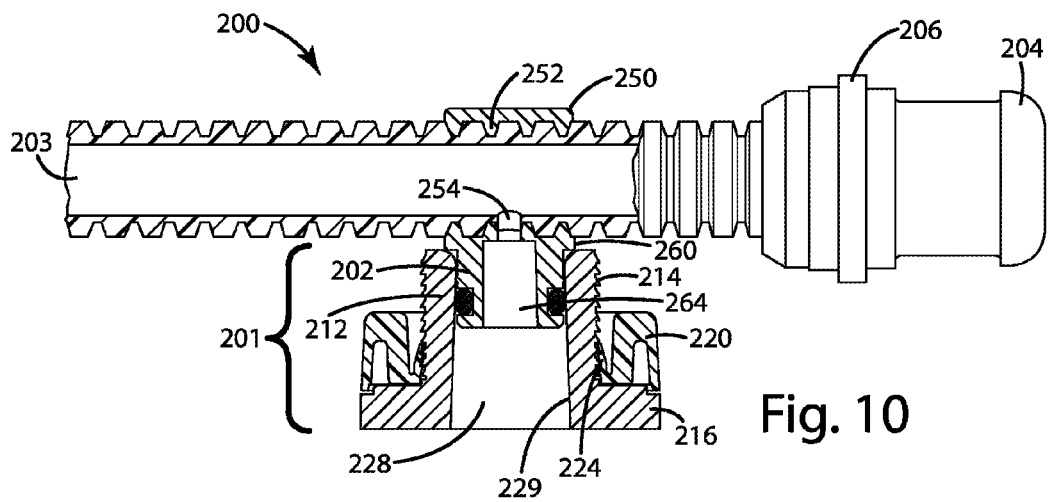
Fig. 10
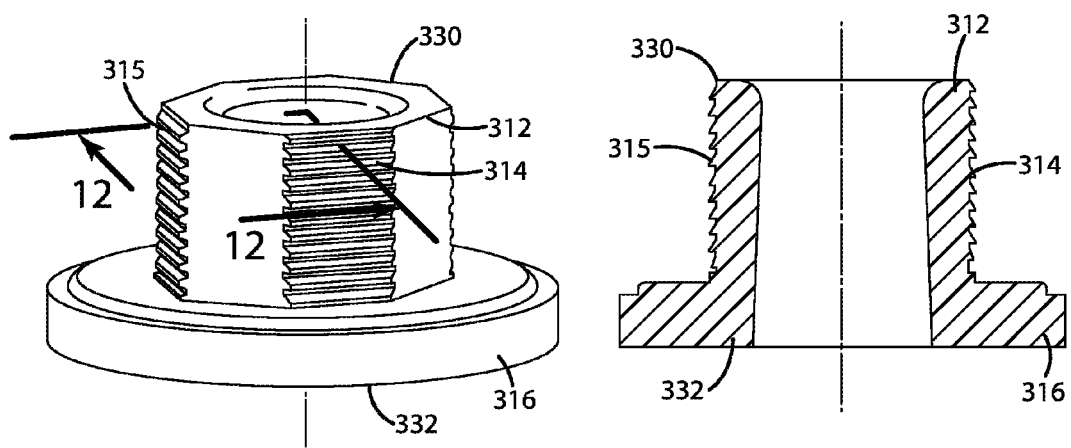
Fig. 11
Fig. 12

THROUGH-HULL FITTING

BACKGROUND OF THE INVENTION

The present invention relates to fasteners and more specifically to ratcheting fasteners.

It is common practice to use an externally threaded shaft, bolt, or tube and a corresponding internally threaded nut for securing joints, individual pieces, and through-wall sockets. Generally, either the shaft or the nut is rotated until the threads of the mating components are secured. This method is susceptible to several problems.

Firstly, mating threaded fasteners such as bolts and nuts are prone to loosening. Through vibration, thermal cycling, or other environmental conditions, the mating threaded elements move relative to each other, loosening the joint. When the joint is no longer clamped or secured, the threaded fastener loses its functionality.

Secondly, helical threads require the fastener system (i.e. shaft or nut or both) to be rotated relative to the mating pieces. Based on the amount of thread, this practice can be time consuming, leading to inefficiencies in the installation process.

Thirdly, helical thread fasteners require friction with a mating surface to prevent loosening and loss of functionality. As the fastener system is rotated, the nut moves axially along the external threads. Generally, the nut and head of the shaft apply the axial clamp force by contacting the surface of the mating objects. Significant torque is often needed to load the threads and retain the necessary clamping force. Friction is not only created in the threads but also on the mating surfaces. The friction created by this action can damage the mating surfaces or even the fastener itself. If any mating surface or the fastener is coated, this damage can remove the coating. Since coatings are often used to protect surfaces from environmental corrosion, damage of the coating can shorten product life.

SUMMARY OF THE INVENTION

The aforementioned problems are overcome by the present invention in which the fastener components ratchet with respect to one another, eliminating the need for relative rotation.

In the current embodiment, the fastener includes a first element comprising a shaft, bolt, or tube (hereinafter referred to simply as a shaft) and a second element comprising a nut. The shaft includes a gear rack and a flange. The nut fits over the shaft and includes at least one pawl to engage the gear rack in a ratcheting fashion. The nut can be pushed axially along the shaft without rotation. The ratcheting interaction of the nut on the shaft locks the nut in position.

In a further aspect of the current embodiment, the shaft and the nut are keyed so that the nut can fit onto the shaft in a limited number of angular orientations. The keying prevents the nut from rotating on the shaft once installed.

In yet a further aspect of the current embodiment, the first element is a tube defining a conduit through the fastener. And more specifically, the tube may be a through-hull fitting with a gear rack, a conduit through the gear rack.

The locking ratchet system does not allow the nut to move relative to the shaft or tube during vibration, thermal cycling, or other environmental conditions. Because the motion to install is axial and not rotational, the time to tighten the joint is reduced. Also, the axial installation reduces the opportunity to damage the mating surfaces through rotation.

These and other objects, advantages, and features of the invention will be more fully understood and appreciated by reference to the description of the current embodiment and the drawings.

BRIEF DESCRIPTION OF THE DRAWINGS

FIG. 6 is perspective view of a fastener according to a first alternative embodiment.

FIG. 7 is a bottom view of the fastener of FIG. 6.

FIG. 9 is a side view of a manifold assembly according to second alternative embodiment.

FIG. 10 is a cross-sectional view of the assembly of FIG. 9.

FIG. 11 is a perspective view of a gear shaft of one embodiment of the fastener.

FIG. 12 is a cross-sectional view of the gear shaft taken along line 12-12 in FIG. 11.

DESCRIPTION OF THE CURRENT EMBODIMENT

Figure 1:
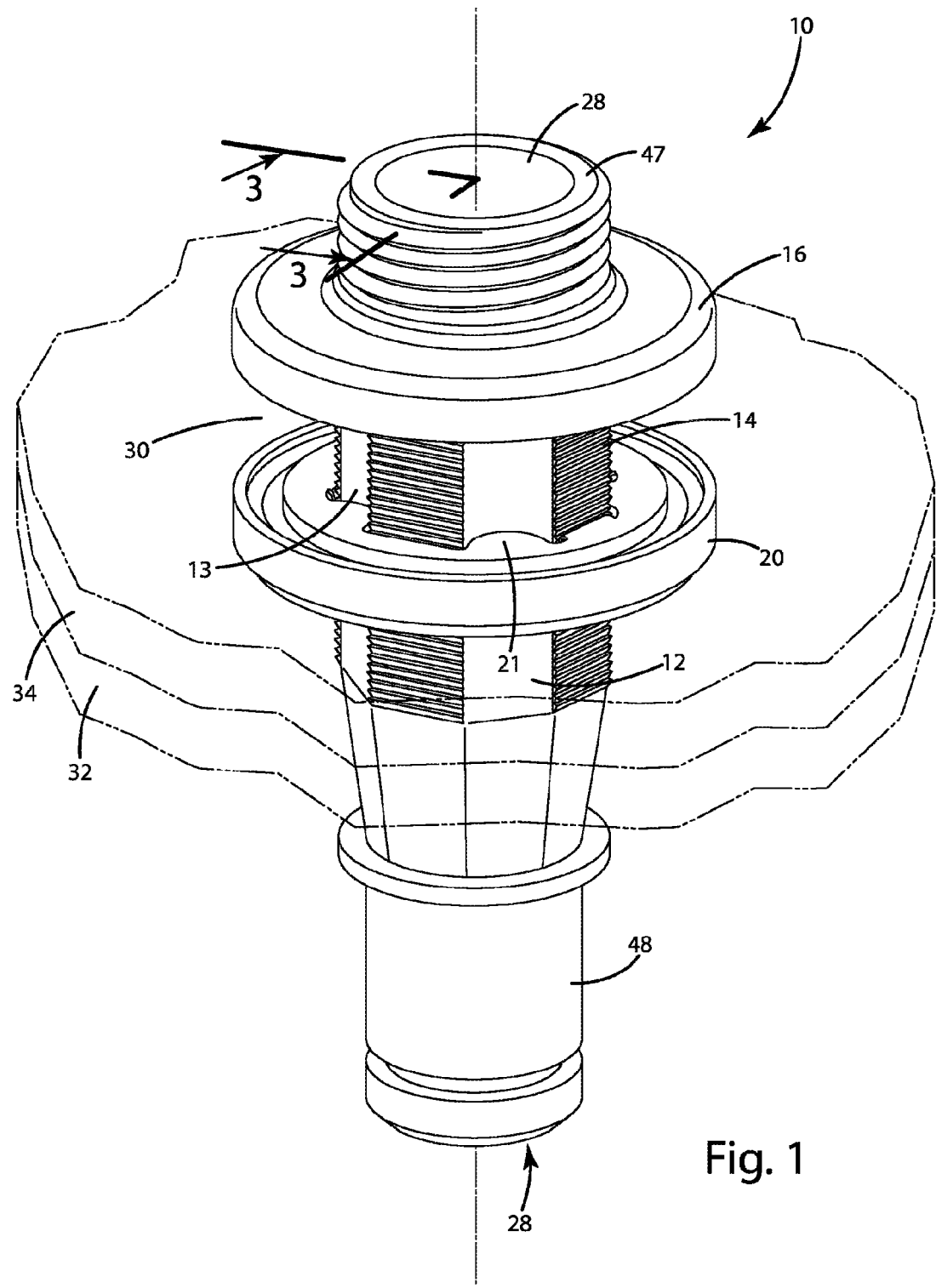
FIG. 1 is a perspective view of the fastener.

Before the embodiments of the invention are described in detail, it is to be understood that the invention is not limited to the details of operation or to the details of construction and the arrangement of the components set forth in the following description or illustrated in the drawings. The invention may be implemented in various other embodiments and can be practiced or carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

Figure 2:
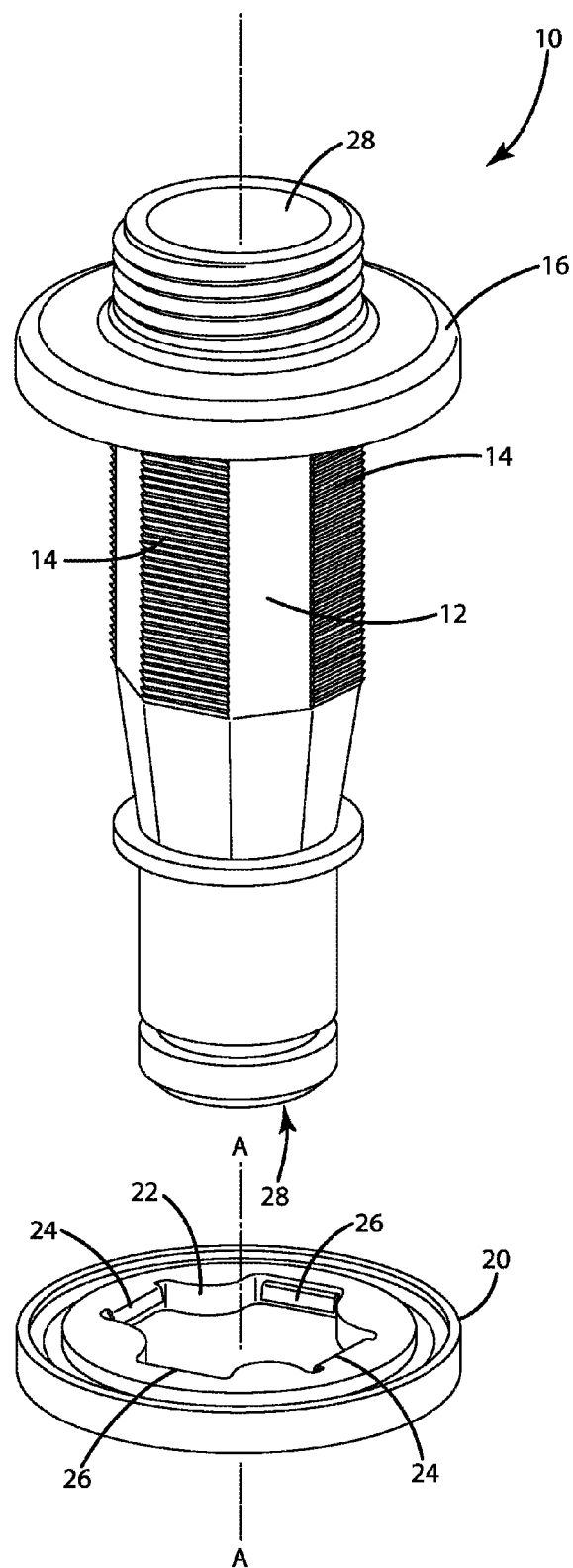
FIG. 2 is an exploded view of the fastener.
Figure 3:
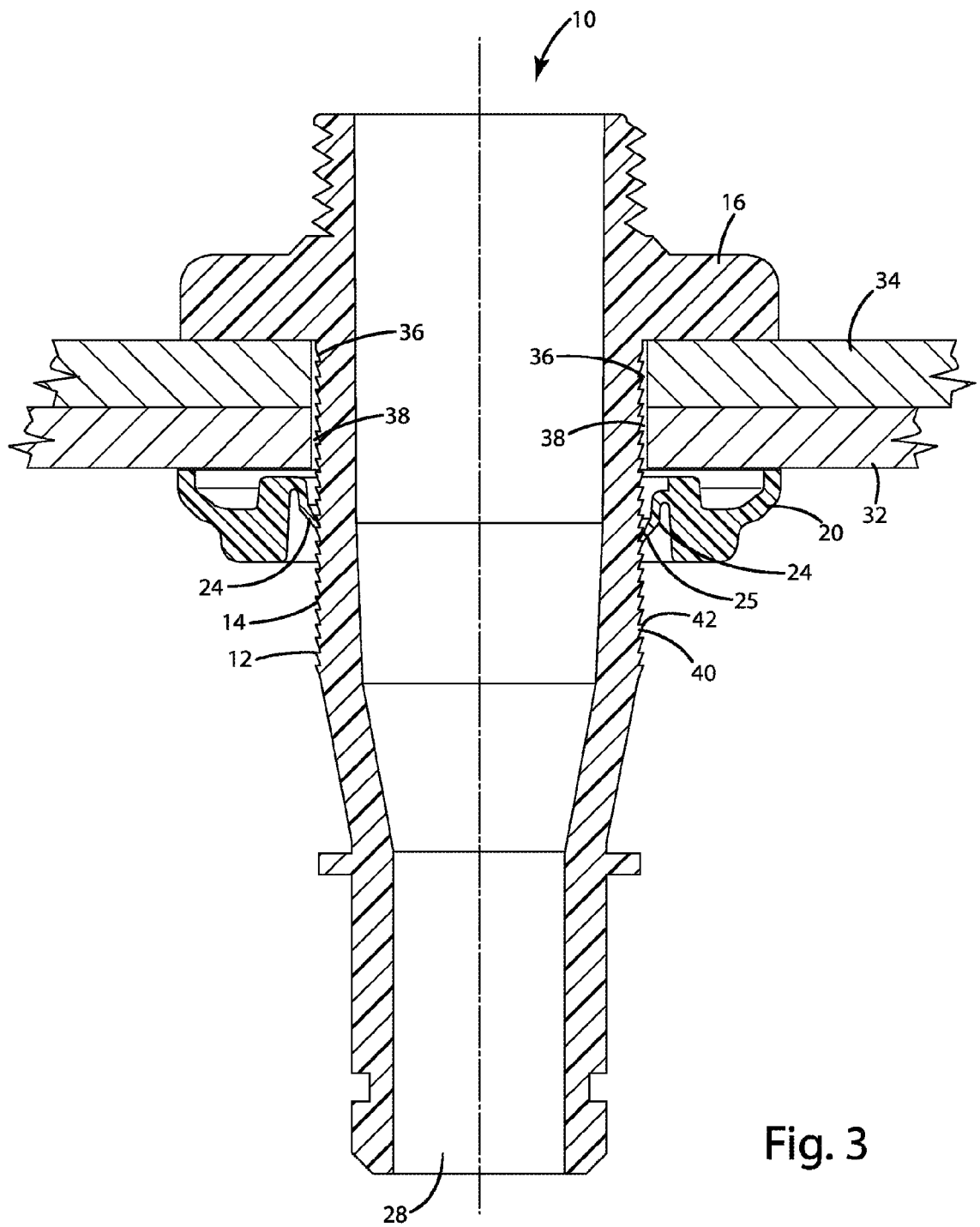
FIG. 3 is a sectional view of the fastener taken along line 3-3 in FIG. 1.

A fastener 10 according to one embodiment of the present invention is shown in FIGS. 1-3. In the illustrated embodiment, the fastener 10 includes a gear rack 12 with a series of projections 14 aligned longitudinally on the gear rack 12. At one end of the gear rack 12 is a flange 16. A nut 20 may be fitted onto the gear rack 12 from an end opposite that of the flange 16. The nut 20 has an inner surface 22 with one or more pawls 24, 26 that may be integrally formed on the inner surface 22 of the nut 20.

As shown in FIGS. 1-5, the inner surface 22 of the nut 20 may have a lip or protrusion 21 that may correspond during use of the fastener 10 with a depression 13 running the functional length of the gear rack 12 of the fastener 10. The alignment of the lip 21 with the depression 13 is useful in guiding the nut 20 into position around the gear rack 12 to quickly and/or efficiently assist the engagement of the pawls 24, 26 with the projections 14 of the gear rack 12. The pawls 24, 26 have tips 25, 27 that are pliable or flexible enough to yield to the approach of the projections 14 as the nut 20 is pushed along the gear rack 12 of the fastener 10 toward the flange 16. The pawls 24, 26 secure the nut 20 into position on the gear rack 12 by catching on the projections 14. The projections 14 may be ramps that allow the flexible/pliable tips 25, 27 of the pawls 24, 26 to move along the leading edge 40 of the ramp/projection 14 and meet or snap into the closing edge 42 of the ramp/projection 14. The meeting of the pawls 24, 26 with the closing edge 42 of the projection 14 may provide tactile confirmation to the user of the package that the nut 20 is securely in place on the gear rack 12.

The steepness of the ramps/projections 14 and the length of the pawl tips 25, 27 may vary, for example, to control the amount of force desired to secure the pawls 24, 26 on the gear rack 16. By virtue of an interference fit, the pawls 24, 26 interact with the protrusions 14 to secure the nut 20 on the gear rack 12. The number of projections 14 along the length of the gear rack 12 may vary and the projections 14 may be positioned in essentially any desired location on the gear rack 12. For example, the projections may be located in the depression 13 and correspond to pawls that are integral to the lip/protrusion 21 on the inner surface 22 of the nut 20. Further, the leading edge 40 of a ramp/projection 14 can vary in steepness to provide more or less resistance when fitting the pawls 24, 26 into the gear rack 12. The relationship of the pawls 24, 26 and protrusions 14 may be configured to prevent the nut 20 from being removed from the gear rack 12 when a force is applied to the nut 20 in an attempt to move it away from the flange 16. Alternatively, by pushing the nut 20 along the gear rack 12 away from the flange 16, the nut may be removed from the fastener 10 provided the pliable tips 25, 27 of the pawls 24, 26 are configured with the projections 14 to allow retreat of the nut 20 from the flange 16 end of the fastener 10 along the gear rack 12 and further allowing removal of the nut 20. The fastener 10 may also include one or more ends 47, 48 which are suitable to provide coupling of the fastener 10 to adjacent components which may vary with the specific application of the fastener 10.

In use, the nut 20 is fitted around the end of the gear rack 12 opposite the flange 16. The nut 20 is moved along the gear rack 12 in a ratcheting fashion toward the flange 16, which may be any radially extending stop. As an alternative to a flange, The nut 20 and flange 16 are spaced apart by at least one item in a space 30 is defined by the distance between the nut 20 and flange 16. The fastener 10 may secure together two or more items 32, 34 in the space 30 between the nut 20 and flange 16. The gear rack 12 of the fastener 10 shown in FIGS. 1 and 3 fits through openings 36, 38 in the items 32, 34 secured together by the fastener 10 when the nut 20 on one side of the items 32, 34 is moved toward the flange 16 on the opposite side of the items 32, 34 and the pawls 24, 26 engage the projections 14 on the gear rack 12. The ratcheting of the nut 20 on the gear rack 12 provides advantages over fasteners that consist of nuts that screw onto a threaded shaft because the nut 20 may be quickly secured in place by pushing the nut 20 into place on the gear rack 12 and does not require time to screw a nut into place. Further, by virtue of the clamp forces created by the pawls 24, 26 and the projections 14, the nut 20 will not loosen during vibrations or thermal cycling, etc. as will a nut that is screwed onto a threaded shaft.

Figure 4:
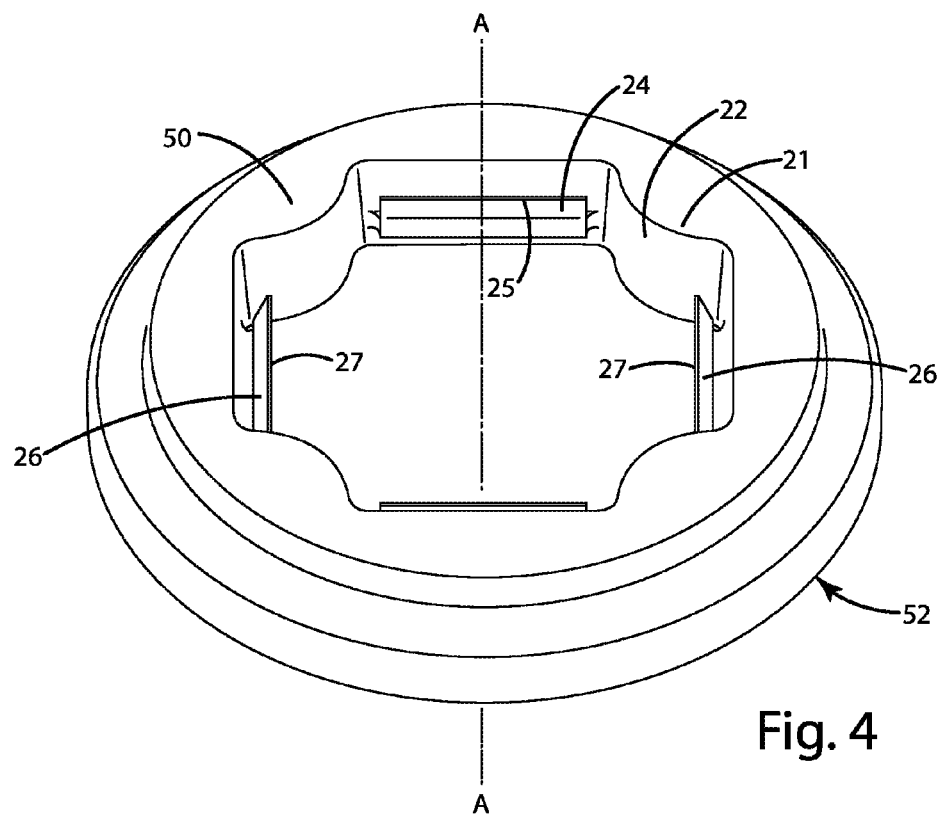
FIG. 4 is a perspective view of the nut of the fastener.
Figure 5:
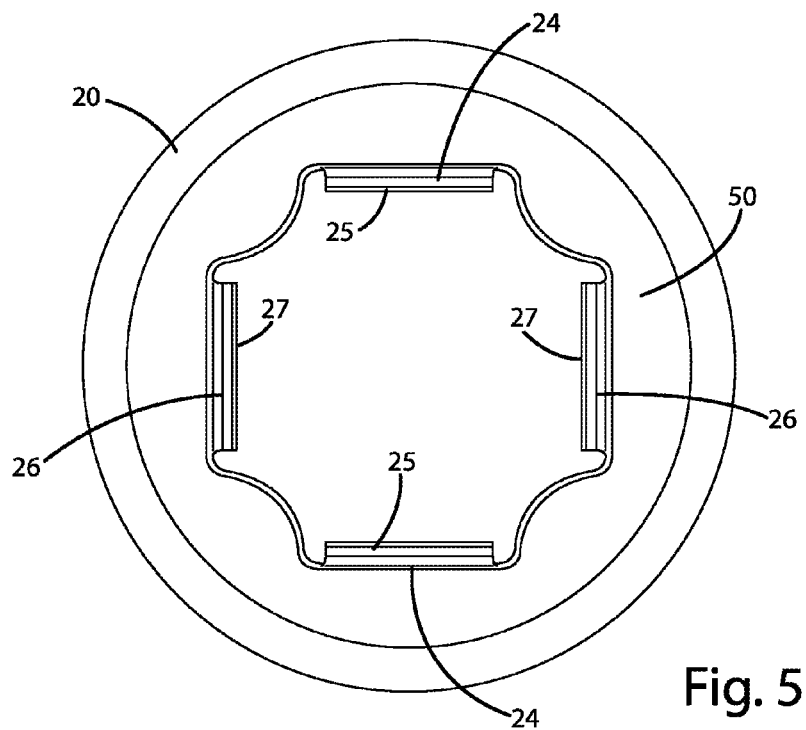
FIG. 5 is a top view of the nut.

The nut 20 as shown in FIGS. 4-5, includes two pairs of parallel pawls 24, 26 located opposite one another on the inner surface 22 of the nut 20. All of the pawls 24, 26 may be positioned on the inner surface 22 of nut 20 in the same location relative to the top 50 of the nut 20 and bottom 52 of the nut 20. Alternatively, the pawls 24 may be off-set within the nut 20 from the pawls 26 relative to the top 50 and bottom 52 of the nut 20. The off-setting of the pawls 24, 26 allows for corresponding off-setting of the pawls 24, 26 along the gear rack 12 in the longitudinal direction and can provide a more precise fit of the fastener 10 around the items 32, 34 to be fastened together. For example, depending upon the spacing between the projections 14 on the gear rack 12 and the size of the pawls 24, 26, the optimized fit of the fastener 10 around the items 32, 34 may fall between projections 14 if the pawls were not off-set. Independent of whether the pawls 24, 26 are off-set, the nut 20 may have an axis A and may be separate and unattached from gear rack 12 and may be removed and rotated about the axis A to fit on the gear rack 12 in more than one orientation. For example, any of the pawls 24, 26 may engage any of the series of projections 14 on the corresponding surfaces of the gear rack 12.

Additionally or alternatively to having off-set pawls as discussed with respect to FIGS. 4 and 5, the protrusions on a gear rack may be off-set. The gear rack 312 of FIGS. 11 and 12 has two sets of opposing sets of protrusions 314, 315 that are off-set from one another with respect to a longitudinal orientation from the top 300 and bottom 332 of the gear rack as shown in FIGS. 11 and 12.

The fastener 10 of FIGS. 1-3 includes a conduit 28 through which fluid may pass or be pumped. In this embodiment, the gear rack 12 is located on the outside of a tube defining the conduit 28 of the fastener 10. The fastener 10 shown in FIGS. 1-3 may be used as a through-hull fitting on a water craft, for example. Rather than securing items 32, 34 together, the fastener 10 may secure itself to a boat by inserting the gear rack 12 through an opening in the boat hull (not shown) so that the flange 16 contacts the hull on one side and the nut 20 is fitted on the gear rack 12 on an opposite side of the hull from the flange 16. As compared to helical threads and corresponding nuts, the ratcheting action of the nut 20 on the gear rack 12 has the advantage of allowing an optimized fit of the fastener 10 with minimal contact of the nut with the hull. This minimizing of contact between the hull (or alternatively between the items 32, 34 to be secured) and the nut 20, prevents scraping of the nut 20 on the paint of the items 32, 34 or gel coat of a boat that results with the turning of a nut on a helical thread.

Figure 8:
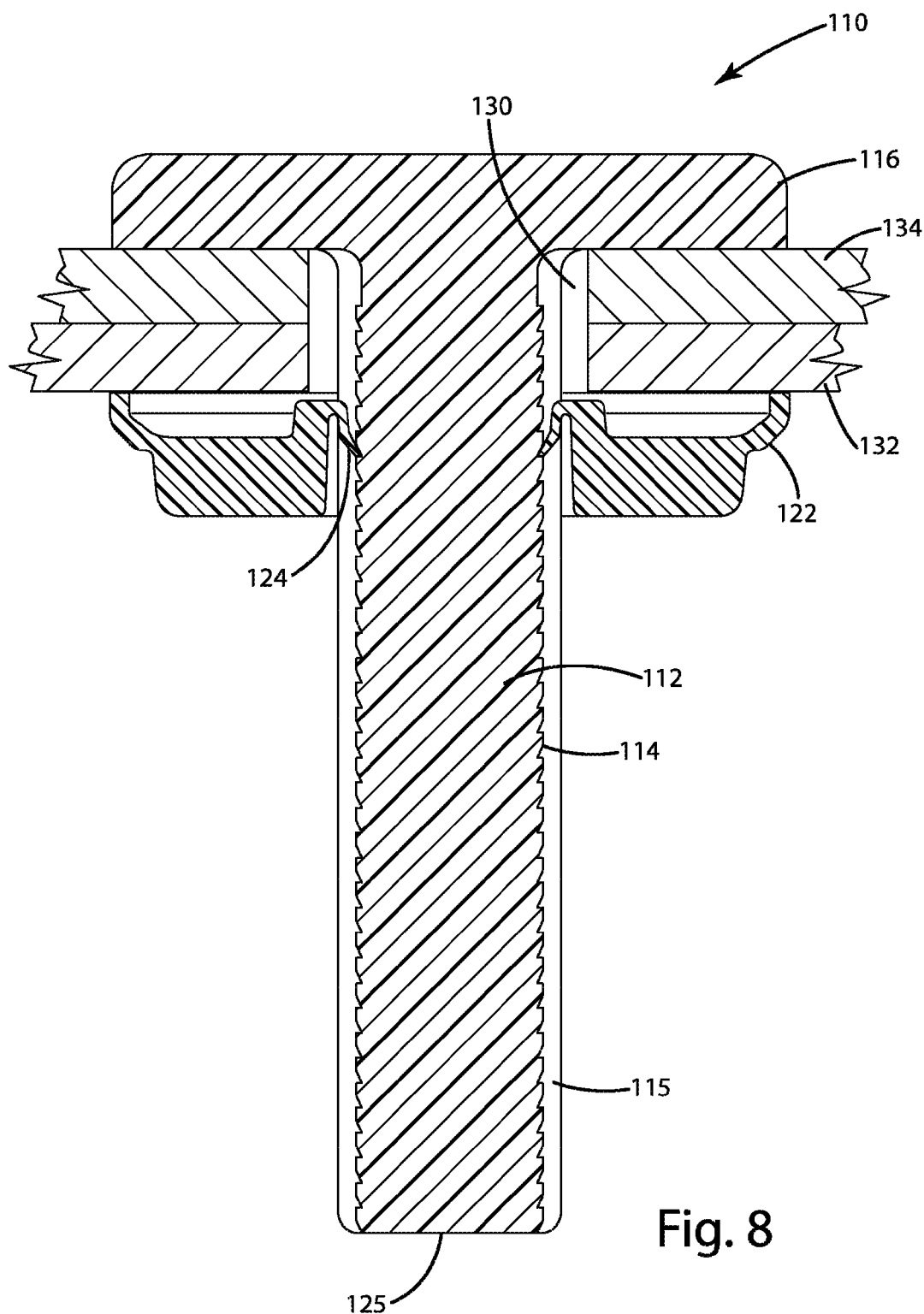
FIG. 8 is a cross-sectional view of the fastener of FIG. 6 taken along the line 8-8 in FIG. 7.

The fastener 10 need not include a conduit as shown in the embodiment illustrated in FIGS. 1-3. Referring now to FIGS. 6-8, the fastener 110 may include a solid gear rack 112 that is shaped to fit any opening or mating surface. In the illustrated embodiment, the fastener 110 includes a gear rack 112 with two substantially flattened surfaces 113 having projections 114 that transverse the gear rack 112 in a longitudinal direction. The gear rack 112 also has substantially rounded edges 115 on either side of the substantially flattened surfaces. While the embodiment of FIG. 6 has a particular shape, it should be understood that the fastener 110 can be configured in a variety of shapes to allow the functionality described herein. The nut 120 has an inner surface 122 with pawls 124 that engage the projections 114 on the gear rack 112 in the same manner as described herein with respect to FIGS. 1-3. The nut 120 may be fitted on the gear rack 112 from a free end 125, or bottom end as viewed in FIG. 6, of the gear rack 112 which is on an opposite end of the fastener 110 from the flange 116. As the nut 120 is moved along the gear rack 112 in a ratcheting fashion toward the flange 116. The nut 120 and flange 116 are spaced apart by the thickness of one or more items 132, 134 in a space 130 that is defined by the distance between the nut 120 and flange 116. The fastener 110 may secure together two or more items in the space 130 between the nut 120 and flange 116, or may serve to secure the fastener 110 to another surface.

Alternative Embodiment

Referring now to FIGS. 9-10, a flexible manifold assembly 200 may incorporate the fastener 201 to facilitate fluid flow through the flexible manifold assembly 200. In this configuration, a corrugated tube 202 has an open end 203 and is closed on the opposite end by a cap 204 and clamp 206. A manifold fitting 250 may include a jacket attachment 252 with an inner surface that may include ribs 252 which can interlace the corrugated ridges of the tubing 202. For applications with non-corrugated tubing, the inner surface may be un-ribbed and secured about the tubing by clamping or compression fit. An opening 254 in a nozzle 260 of the fitting 250 provides fluid communication between the tubing 202 and the fastener 201 through the nozzle 260. The nozzle 260 may be coupled to the fastener 201 by any known means. In the illustrated embodiment, an outer wall 262 of the nozzle 260 is mated to a wall 229 of the conduit 228 of the fastener 201. The nozzle 260 may further include an annular passage 264.

The fastener 201, along with the manifold fitting 250 and nozzle 260 may facilitate a flow of air or water from a source (not shown) through the conduit 228 of the fastener, into the nozzle 260 and into the tubing 202 through the manifold fitting 250. This configuration has several applications including, but not limited to providing warm air to a garment for the purposes of warming a patient. In the case of a warm air application, an end or fitting of a hose or pipe from a warm air source may be fitting over or around the flange 216 of the fastener 201. The hose or pipe may be quickly and efficiently coupled to the fastener 200 by axially moving the nut 220 along the gear rack 212 toward the flange 216 so that the pawls 224 engage the projections 214 on the gear rack 212 and secure the end or fitting of the hose or pipe between the flange 216 and the nut 220. Once the warm air source is connected to the fastener 201, the flow of warm air may move into the manifold fitting 250 through the tubing 202, out the open end 203 and into a garment (not shown) or other area or enclosure, etc. where warm air is desired.

Similarly, the configuration described above may be useful for supplying cool air for applications requiring cooling of an area or enclosure. Alternatively, this configuration may be coupled to a water source (not shown) by the fastener 201. In that case, the open end 203 will facilitate the flow of water in applications, such as for gardening or washing, etc., that require a flow of water, or may be used to provide hot or cool water when needed for temperature sensitive applications.

CONCLUDING COMMENTS

Directional terms, such as "vertical," "horizontal," "top," "bottom," "upper," "lower," "inner," "inwardly," "outer" and "outwardly," are used to assist in describing the invention based on the orientation of the embodiments shown in the drawings. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents.

This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to elements in the singular, for example, using the articles "a," "an," "the" or "said," is not to be construed as limiting the element to the singular.

The embodiments of the invention in which an exclusive property or privilege is claimed are defined as follows:

1. A through-hull fitting comprising:
   an elongated body including a plurality of gear racks and a radially extending stop, the stop extending radially outwardly beyond the gear racks, the body defining a water conduit therethrough; and
   a nut fitted over said elongated body and having a plurality of pawls and a radially extending stop, the stop extending radially outwardly beyond the pawls, each pawl engaging one of said gear racks, said elongated body and said nut being keyed to one another to prevent relative rotation therebetween, said elongated body and said nut being physically separate elements.

2. The through-hull fitting of claim 1 wherein:
   said elongated body includes at least four of said gear racks; and
   said nut includes at least four pawls.

3. The through-hull fitting of claim 2 wherein:
   said gear racks include a first set of opposing gear racks and a second set of opposing gear racks; and
   said pawls include a first set of opposing pawls and a second set of opposing pawls.

4. The boat assembly of claim 2 wherein:
   said gear racks include a first set of opposing gear racks and a second set of opposing gear racks; and
   said pawls include a first set of opposing pawls and a second set of opposing pawls.

5. The boat assembly of claim 1 wherein:
   said elongated body includes at least four of said gear racks; and
   said nut includes at least four pawls.

6. A boat assembly comprising:
   a hull having a first side and a second side and defining a hole therethrough; and a through-hull fitting in turn comprising:
   an elongated body including a plurality of gear racks and a radially extending stop, the stop extending radially outwardly beyond the gear racks, the body defining a water conduit therethrough; and
   a nut fitted over said elongated body and having a plurality of pawls and a radially extending stop, the stop extending radially outwardly beyond the pawls and engaging the second side of the hull, each pawl engaging one of said gear racks, said elongated body and said nut being keyed to one another to prevent relative rotation therebetween, said elongated body and said nut being physically separate elements.

* * * * *